June 26, 1956     D. C. ERDMAN     2,751,783
APPARATUS FOR COUPLING ULTRASONIC WAVES
Filed Jan. 25, 1952     3 Sheets-Sheet 1
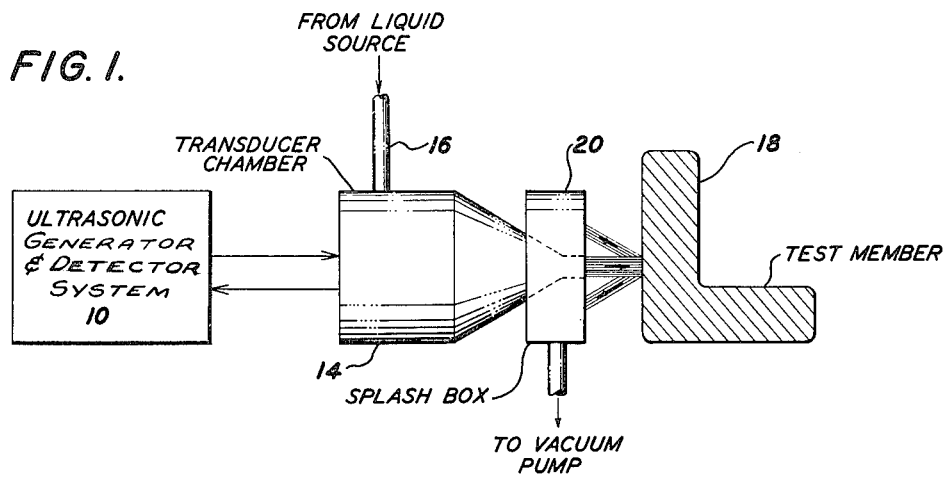
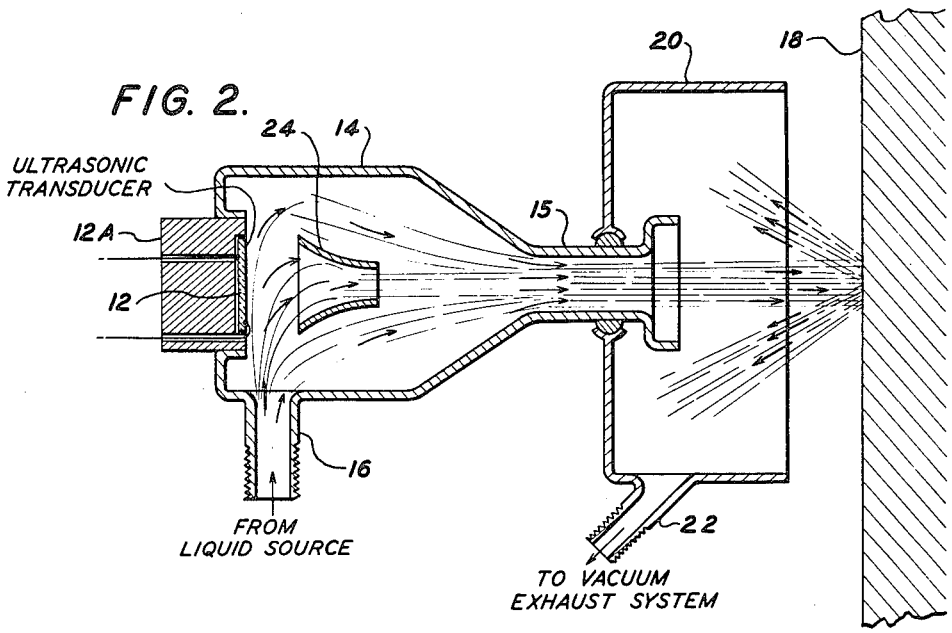
INVENTOR.
DONALD C. ERDMAN
BY
*James B. Christie*
ATTORNEY June 26, 1956  D. C. ERDMAN  2,751,783
APPARATUS FOR COUPLING ULTRASONIC WAVES
Filed Jan. 25, 1952  3 Sheets-Sheet 2

INVENTOR.
DONALD C. ERDMAN
BY James B. Christie
ATTORNEY

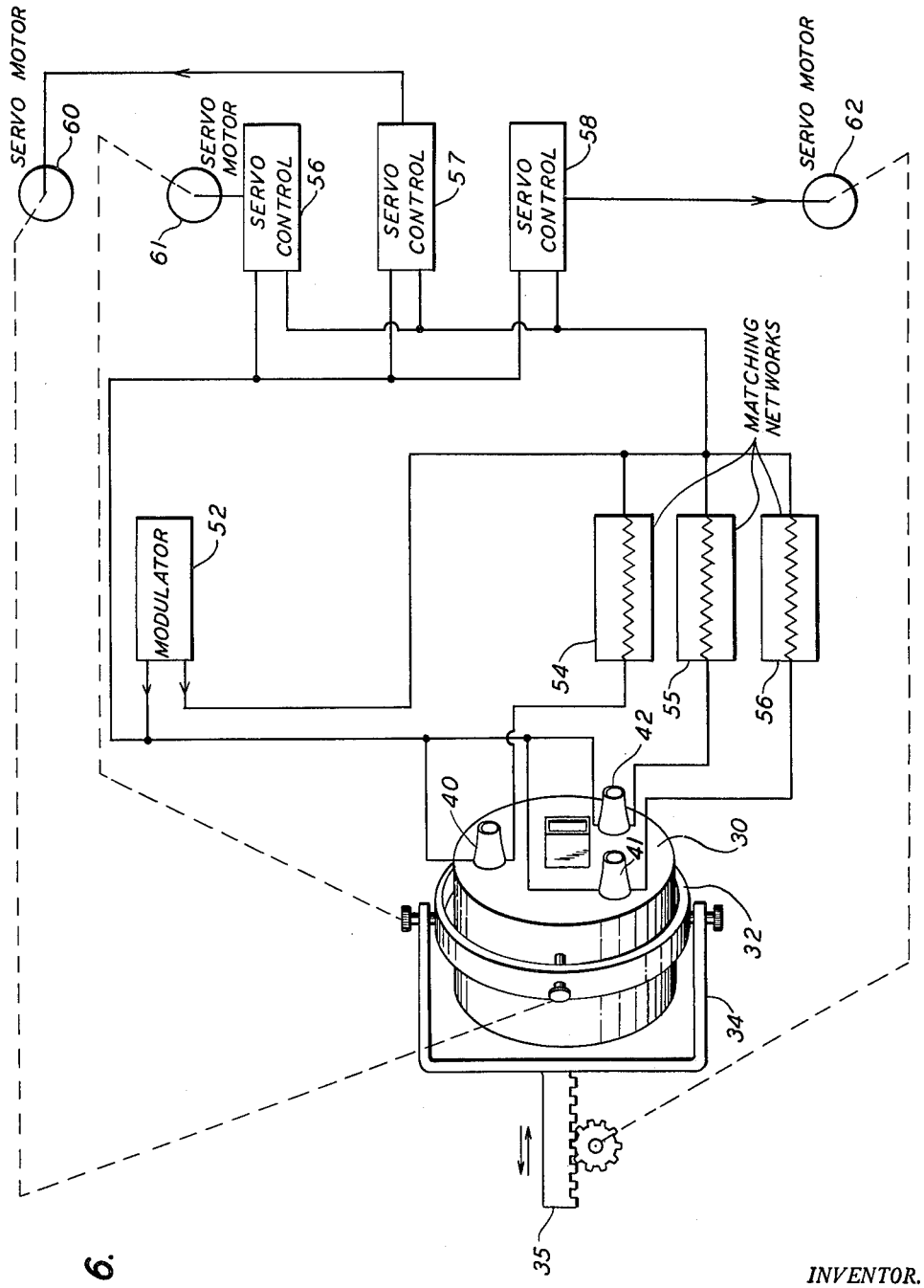

United States Patent Office 2,751,783
Patented June 26, 1956

2,751,783

APPARATUS FOR COUPLING ULTRASONIC WAVES

Donald C. Erdman, Pasadena, Calif., assignor to Electrocircuits Incorporated, Pasadena, Calif., a corporation of California Application January 25, 1952, Serial No. 268,220

8 Claims. (Cl. 73—67)

This invention is in the field of ultrasonics and relates particularly to improved apparatus for ultrasonic coupling, i. e. for coupling a source of ultrasonic impulses or signals to a remote object so as to provide for the incidence and reflection of such signals at the object.

An increasingly important application of ultrasonic techniques is in the inspection of metal forms or metal joints, i. e. weldments or the like. In general the principle upon which such ultrasonic inspection is based is the interference to and consequent reflection of ultrasonic waves from a discontinuity in the path of propagation as occurring at the surface of a metal object or at a flaw within the object. A flaw, in the ultrasonically detectable sense, is a sharp change in density or Young's Modulus. Internal flaws present such discontinuities and are therefore susceptible to detection and accurate location through the transmission and reflection of ultrasonic signals.

Since high frequency sound will not travel even minute distances through air without severe attenuation, some form of liquid coupling between the ultrasonic transducer and the metal test object is almost essential. Liquid coupling is a satisfactory expedient and insures intimate acoustic contact.

To date, liquid coupling for the transmission and reflection of ultrasonic waves has been accomplished either by immersion of both the source and the test object in a liquid bath or by means of either a stationary or flowing liquid film on the surface of the object under inspection, the film serving as a seal between the contacting faces of an ultrasonic transducer and the object. Both of these approaches to the problem of liquid coupling have been shown to have significant disadvantages for echo type flaw detection. (Iron Age, "Immersed Ultrasonic Flaw Detection," Rebecca A. Smith and Donald C. Erdman, August 4, 1949.) Total immersion places a definite limitation on the size of an object susceptible to this type of inspection as well as on the mobility of the inspection equipment. So-called "liquid film" coupling is susceptible to spurious signals arising from multiple echoes between the transducer and the object and is subject to appreciable interference from microscopic protrusions or the presence of residual abrasive on the surface of the object being inspected. These interferences are a consequence of the close proximity of the transducer and the object necessary to make use of the thin coupling film.

I have now developed an apparatus for liquid coupling for ultrasonic inspection apparatus which overcomes the above mentioned limitations inherent in the presently practiced techniques. I have found that the required coupling for both transmission and reflection of ultrasound may be provided by means of a liquid stream or jet flowing in a direct line and forming an uninterrupted liquid bridge between the ultrasonic transducer and the test object. Such a stream is capable of simultaneously carrying both transmitted and reflected ultrasonic signals, one or the other of which will inherently travel countercurrently in the stream. The liquid stream need not be confined and may thus bridge a completely unconfined gap of a fraction of an inch up to several feet between a transducer and the subject of inspection. The stream, in accordance with the invention, is in effect modulated by the impressed ultrasonic waves and is thus conveniently referred to as a modulated coupling stream.

In one aspect therefore the invention contemplates in ultrasonic flaw detection wherein ultrasonic waves are introduced into a member to be tested and the reflection pattern of such waves is sensed, the improvement which comprises locating the source of ultrasonic waves at a distance from said member in excess of about $\frac{1}{32}''$, causing a liquid to flow in an uninterrupted stream between the source and the member and either from the source to the member or vice versa whereby the ultrasonic waves developed at the source are propagated from the source to the member through the stream and receiving at the source those waves reflected from the member along the same stream.

It is important that the liquid stream intimately contact the surface of the ultrasonic transducer to effect efficient energy transfer. One method of insuring this condition is to actually flow the liquid stream across the transducer before directing it toward the test object.

As a matter of practical mechanics, the liquid stream is generally caused to flow in the direction from the source to the member. Apparatus for accomplishing this effect is illustrated and described herein. However, such is not an inherent limitation of the invention, which may be practiced with the aid of a liquid stream flowing from the member to the source. In addition, the liquid stream may be either totally confined or at least partially unconfined in bridging the gap between the source and the member, but more effective operation is achieved with a partially unconfined stream, and for this reason such a stream is preferred. The stream length is usually made greater than ¼ the thickness of the object being inspected to avoid multiple echoes in the stream interfering with echoes from within the inspected object.

The invention contemplates various forms of apparatus for carrying out the method as described above and in this respect is directed to ultrasonic coupling apparatus comprising a housing defining a chamber, an ultrasonic transducer mounted in the housing, an outlet orifice in the housing, and means for flowing a stream of liquid into the housing to contact the transducer within the housing and to be ejected through the outlet orifice as an acoustically modulated stream.

In one embodiment of the invention a collection trough is provided adjacent the outlet orifice to collect any liquid splashing from the object as a result of the impingement of the liquid stream thereon. In accordance with presently preferred practice such a collection trough is connected to a source of vacuum, as for example a high velocity vacuum pump, so as to actually suck any liquid spray from the region of the object being tested. Since the reflected ultrasonic waves travel in the modulated stream itself, the collection of the stream spray in this fashion in no way interferes with the sensing operation.

The collection trough may be supported totally independently of the transducer housing and may take any desired shape. An annular cup is particularly satisfactory with the modulated stream passing centrally therethrough. Alternatively, the collection trough may be supported as a unit on the outlet end of the transducer housing as hereinafter described.

In co-pending application Serial No. 190,078, filed October 14, 1950, by George B. Greene and myself, a crystal erection system was described and illustrated, whereby a number of ultrasonic transducers were employed to automatically orient an ultrasonic inspection head with respect to the surface of an object undergoing test. In essence this apparatus comprises a so-called search transducer and one or more outrigger transducers, the latter acting as range finders and being connected to suitable servo mechanism to orient the search transducer in a predetermined position and to maintain this predetermined orientation with respect to the surface undergoing test regardless of the configuration thereof.

The present invention also finds use in apparatus of the type described in the aforementioned application. For this purpose a separate uninterrupted liquid stream is maintained between each of the transducers, i. e. search and outrigger transducers, and the object undergoing test, the reflected waves to which each of the several transducers is sensitive being propagated counter-currently in the respective coupling streams.

The invention will be more clearly understood from the following detailed description thereof taken in conjunction with the accompanying drawings in which:

Fig. 1 is a diagrammatic illustration of an ultrasonic flaw detector incorporating one form of apparatus in accordance with the invention by means of which the method of invention may be practiced;

Fig. 2 is a sectional elevation through coupling means forming a part of the apparatus of Fig. 1;

Fig. 6 is a schematic drawing illustrating a crystal erection system for the embodiment of the invention shown in Figs. 3, 4 and 5.

Figure 3:
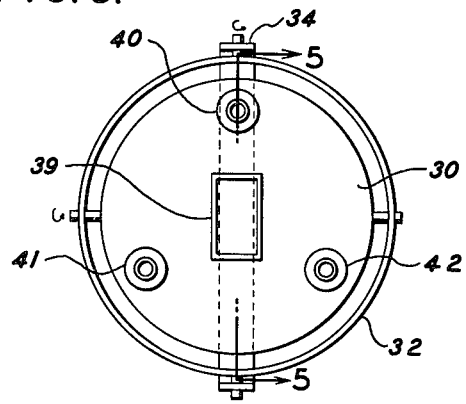
Fig. 3 is a front elevation of apparatus adapted to embody the crystal erection principle of the aforementioned co-pending application.

An echo-type or frequency modulated ultrasonic flaw detector sends pulses of electric power to a chamber containing an ultrasonic transducer capable of converting electric into acoustic energy. In Figs. 1 and 2 of the drawing an ultrasonic generator and detector system is shown diagrammatically at 10. The system 10 provides power to energize a transducer and also senses reflected waves received by the transducer. Pulse-type circuitry suitable for this use is shown in United States Patent 2,280,226 issued to Floyd A. Firestone on April 21, 1942, and frequency modulated circuitry, also suitable, is shown in United States Patent 2,593,865 issued to me on April 22, 1953. An ultrasonic transducer 12 is located within a transducer chamber 14 and is electrically coupled to the generator and detector system 10. The chamber 14 carries the transducer 12 in one end and forms a nozzle 15 at its opposite end. A nipple 16 opens into the chamber adjacent the end in which the ultrasonic transducer is mounted and provides for the introduction of a liquid into the chamber.

The transducer 12 radiates acoustic energy into the moving liquid stream flowing into the chamber, the stream thereafter issuing from the nozzle 15 to be directed against a test member 18. Echoes from the surface of the object and also from internal flaws return back along the moving stream and are picked up by the transducer 12 and converted into electrical signals which are conventionally displayed by the ultrasonic generator and detector 10. The generator and detector system itself forms no part of the present invention and accordingly is not illustrated or described in detail. For a somewhat detailed description of this portion of the apparatus, reference may be had to the aforementioned co-pending application.

In the embodiment shown in Figs. 1 and 2, splash of the liquid from the object being examined is collected in a splash tray 20 conveniently supported in pivotal relationship on the end of nozzle 15. In a preferred embodiment the tray 20 is provided with a nipple 22 for connection to a vacuum exhaust system, as for example a high velocity vacuum pump (not shown). The tray thus evacuated is capable of sucking the spray from the object even though it be spaced one-eighth of an inch or more from the surface of the object.

It is often desired that the modulated liquid stream be directed toward the surface of the object 18 at an angle and at the same time maintain the vacuum tray 20 parallel to the surface under examination. For this purpose physical connection between the tray 20 and the nozzle 15, if any, is preferably in the nature of a pivotal joint so that the relative angular orientation of the tray and the nozzle may be varied.

The transducer 12 may be quartz, barium titanate or other satisfactory material and is usually mounted in the face of a cartridge 12A as illustrated. The transducer is placed in the transducer chamber 14 so that liquid entering through the nipple 16 will flow across its surface, thus assuring adequate wetting of the transducer and efficient modulation of the liquid stream. The cartridge 12A is a liquid-proof holder that carries the electric cable connections from the ultrasonic detector 10. The holder is preferably made of an acoustic damping material such as a plastic (Calkyd resin or similar homogeneous resin) that will lower the ringing properties of the transducer.

The transducer chamber itself is so shaped as to direct the liquid stream against the surface of the transducer as above mentioned and is of sufficient volume that liquid flow therethrough is substantially free of turbulence. The outlet nozzle 15 may be shaped to define the issuing liquid stream in either circular or rectangular configuration or in a fine jet. An exponential horn-shaped nozzle has the advantage of allowing greater energy transfer into the liquid stream. The stream leaving the nozzle is modulated by the ultrasonic energy and the same stream will return echoes counter-currently from the test object 18 to the transducer 12 which may simultaneously emit and receive such energy.

A liquid stream to be modulated in accordance with the invention is defined as having a cross section of from 6 x 6 inches down to a jet of cross section of approximately .01 of an inch in diameter. The stream may have an unconfined length varying from $\frac{1}{32}$ of an inch to five feet. Liquid velocities in excess of .01 of an inch per second are required. There is no limitation to the viscosity of the liquid which may be used to form the modulated stream other than such limitations imposed by practical working conditions such as jet velocity, unconfined length, cross section, and the like.

A modulated coupling stream in accordance with the invention provides a freely movable acoustic connection between an ultrasonic source and an object being inspected for internal flaws. The stream can have sufficient length to prevent confusion by the multiple echoes between the transducer and the test object. The stream is in no way damaged by collision with surface protrusions or residual abrasives on the object being inspected, such obstacles being in this manner completely obscured as a factor in the flaw inspection. A modulated coupling stream obviates the need for totally or partially immersing the object being inspected and provides a high degree of mobility in the inspecting apparatus.

Various means may be employed to improve the coupling or impedance matching between the transducer and the liquid flowing through the transducer chamber 14. One such means is shown in the sectional elevation of Fig. 2 and comprises one or a multiplicity of exponential horns 24 supported coaxially in the chamber adjacent the emitting surface of the transducer 12. The exact functioning of this horn is not known, although it has been found to increase the power introduced into the liquid by the transducer. The action may be a collimating one or an impedance matching one, and may be accomplished by means other than the horn as illustrated.

Reference was made above to a co-pending application describing a crystal erection system for use in ultrasonic flaw detection apparatus. The principle of this system is the provision of auxiliary transducers arranged at spaced points with respect to the principle or search transducer and connected to suitable circuitry so as to maintain the search transducer at a given distance and a given angular orientation with respect to the surface of an object being tested. The principle of liquid coupling in accordance with the present invention may be combined with that of crystal erection, apparatus for so doing being shown in front elevation in Fig. 3, side elevation in Fig. 4 and vertical sectional elevation in Fig. 5.

The present invention has nothing to do with the circuitry by means of which the several transducers are caused to provide the orientation effect, above noted, and the drawing is related only to the coupling of the several transducers to a test object through an unconfined liquid stream. Referring to Fig. 3 a test head 30 is pivotally mounted in a first gimbal 32 which is similarly mounted in a second gimbal 34 to provide rotation of the test head about transverse axes. The second gimbal 34 is mounted on a shaft 35, which, in normal practice, may be automatically adjusted along its longitudinal axis to control the linear displacement of the test head 30.

In a crystal erection system, as described in the aforementioned co-pending application, servo means are provided for controlling not only the linear displacement of the shaft 35 but also the angular displacement of the head 30 in the gimbal 32 and of the gimbal 32 in the gimbal 34.

Figure 5:
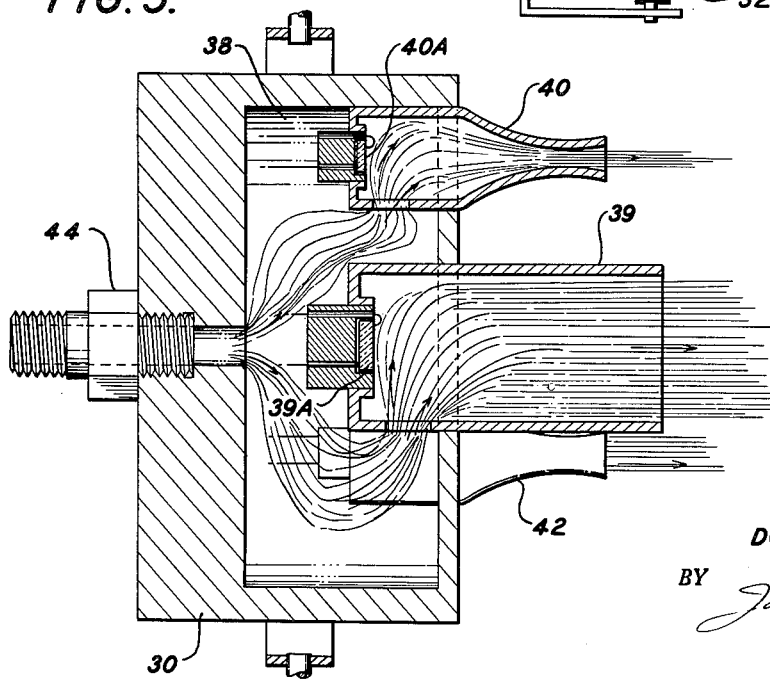
Fig. 5 is a sectional elevation taken on the line 5—5 of Fig. 3.

The head 30 defines a hollow housing 38 on which a plurality of transducer chambers 39, 40, 41 and 42 project, the chamber 39 being centrally located to contain the search transducer and the chambers 40, 41 and 42 being positioned to contain the outrigger transducers. As shown in Fig. 5 each of the chambers 39 and 40 extend into the housing 38 defined within the test head 30 and are provided at one end with ultrasonic transducers 39A, 40A respectively in a manner similar to the apparatus shown in Fig. 2. Chambers 41 and 42, which do not appear in section in Fig. 5, are constructed in the same manner as the chamber 40, each being provided with an opening or port for liquid flow into the chamber and across the face of the transducer therein mounted. A nipple 44 on the head 30 provides for introduction of liquid into the housing 38 from whence it flows through the respective ports into the several transducer chambers. Each of the several transducer chambers projects from the head to form separate spaced nozzles all opening in the same direction.

In this respect it is apparent that each of the several transducer chambers may be separately connected to one or several liquid sources. It may prove desirable under certain circumstances to use liquids of differing viscosity or surface tension in association with different ones of the several transducers.

Figure 4:
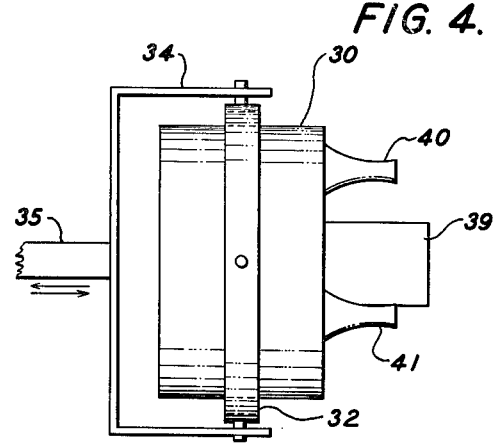
Fig. 4 is a side view of the apparatus of Fig. 3.

The effect of the apparatus shown in Figs. 3, 4 and 5 is to produce four ultrasonic modulated liquid streams, each functioning independently of the other to project through an unconfined stream an ultrasonic signal to a test object (not shown) and to receive back reflections from this test object. The several outrigger transducers are interconnected electrically to provide the necessary intelligence to position and orient the head 30 with respect to the test object in a predetermined relationship.

Fig. 6 illustrates a system for controlling the orientation of the test head 30 of the apparatus illustrated in Figs. 3, 4 and 5.

A modulator 52 is connected across the opposite faces of the outrigger transducers which are located in the chambers 40, 41 and 42. Matching networks 54, 55 and 56 are connected in series between the modulator 52 and the respective outrigger transducers for matching the impedances of the transducers and the transmission lines. The modulator 52 provides electrical impulses to the respective outrigger transducers in response to which the transducers transmit ultrasonic waves which may be conveyed through the streams of liquid which are emitted from the respective chambers 40, 41, 42.

Three servo control circuits 56, 57 and 58 are coupled to receive the electrical impulses from the modulator 52 and to receive the ultrasonic signals which are received by the three outrigger transducers. The servo control circuits are coupled to servomotors 60, 61 and 62. The servo motor 60 serves to orient the test head 30 in the gimbal 32, the servomotor 61 serves to orient the gimbal 32 in the gimbal 34, and the servomotor 62 serves to position the rack 35.

The servo controls serve to provide signals in accordance with the time interval between propagation and reception of the reflected ultrasonic waves so as to provide the desired control action to orient the test head 30 with respect to the object being tested. Various types of servo controls may be employed. One suitable circuit is described in the above-mentioned patent application Serial No. 190,078.

Although not so illustrated, the multiple jet test head illustrated in Figs. 3, 4 and 5 may be used in conjunction with a suction tray in a manner similar to that of the apparatus of Fig. 2. The use of a suction tray in any case is not essential and is recommended merely to reduce the liquid loss and the cleaning problems attendant thereon. A suction tray, as used, need not be dependently mounted to the test head in the manner shown in Fig. 2, but again it is conveniently so mounted as being supported thereby. If using such a suction tray in conjunction with the multiple jet ahead of Fig. 3, I have found that it is more satisfactory if no attempt is made to conjointly support the test head and the suction tray. In such event the suction tray is of annular configuration so that the modulated liquid streams will pass through the central portion of the suction tray, the annulus thereof serving to collect the splash from the several jets. The principle of operation of a suction tray so arranged is identical to that of the tray 20 shown in Fig. 2.

I claim:

1. Ultrasonic coupling apparatus adapted to couple vibrations from an ultrasonic transducer to an object to be tested comprising a housing defining a chamber having an outlet orifice therein, an ultrasonic transducer mounted in the housing, and means for directing a stream of liquid into the housing in contact with the transducer to discharge as a solid liquid jet through the orifice and to impinge on the object whereby the ultrasonic vibrations from the transducer are transmitted between the transducer and object through the stream of liquid with the vibrations traveling parallel to the liquid flow between the transducer and the object.

2. Ultrasonic coupling apparatus adapted to couple vibrations from an ultrasonic transducer to an object to be tested comprising a housing defining a chamber having an outlet orifice therein, an ultrasonic transducer mounted in the housing opposite the outlet orifice, and means for directing a stream of liquid into the housing in contact with the transducer to discharge as a solid liquid jet through the orifice and to impinge on the object as an unconfined liquid stream whereby the ultrasonic vibrations from the transducer are transmitted between the transducer and object through the stream of liquid with the vibrations traveling parallel to the liquid flow between the transducer and the object.

3. Ultrasonic coupling apparatus adapted to couple vibrations from an ultrasonic test transducer to an object to be tested and operable to permit orientation of such transducer with respect to the object comprising a housing defining a chamber and having a plurality of outlet orifices therein, the test transducer being mounted in the housing opposite one of the orifices, separate additional ultrasonic transducers mounted in the housing opposite each of the outlet orifices, and means for directing a stream of liquid into the housing in contact with each of the transducers to flow as a solid liquid jet through the respective orifices and to impinge on the object as a plurality of jets so that ultrasonic vibrations may be separately transmitted between the separate transducers and the object through the respective liquid jets with the vibrations traveling parallel to the liquid flow between the transducers and the object, whereby the time differential between transmission and reception at the several transducers permits the separate additional transducers to provide signals for orientation of the test transducer with respect to the object to be tested.

4. Ultrasonic coupling apparatus adapted to couple vibrations from an ultrasonic transducer to an object to be tested comprising a housing defining a chamber and having an outlet nozzle in the form of an exponential horn, an ultrasonic transducer mounted in the housing, and means for flowing a stream of liquid into the housing across the face of the transducer and directing the stream through the nozzle as a solid liquid jet to impinge on the object whereby ultrasonic vibrations are transmitted between the transducer and the object through the stream with the vibrations traveling parallel to the liquid flow between the transducer and the object.

5. Apparatus for ultrasonic flaw detection comprising a source of ultrasonic waves, means producing a liquid jet flowing between the source and a member to be tested to impinge on the member, means energizing the source to transmit ultrasonic vibrations for propagation into the member through the liquid jet whereby waves are reflected from the member and travel in the opposite direction in the jet to impinge on the source.

6. Apparatus for ultrasonic flaw detection comprising a source of ultrasonic waves, means producing a solid liquid stream, means causing the liquid stream to flow across the face of the source and thereafter to flow as a liquid jet between the source and a member to be tested to impinge on the member, means energizing the source to transmit ultrasonic vibrations into the member through the liquid jet whereby waves are reflected from the member and travel in the opposite direction in the stream to impinge on the source.

7. Apparatus for ultrasonic flaw detection comprising a source of ultrasonic waves, means producing a liquid jet flowing between the source and a member to be tested to impinge on the member, means energizing the source to transmit ultrasonic vibrations for propagation into the member through the liquid stream whereby waves are reflected from the member and in the opposite direction in the jet to impinge on the source, and means for separately collecting a portion of the liquid jet after impingement on the face of the member.

8. Apparatus for ultrasonic flaw detection which comprises a housing, a source of ultrasonic waves mounted in the housing, means producing a liquid stream flowing across the face of the source, means causing the liquid stream to flow between the source and the member as a jet in a direction parallel to the direction of wave travel between the source and the member and to impinge on the member, means energizing the source to transmit ultrasonic vibrations for propagation into the member through the liquid stream whereby waves are reflected from the member and travel in the opposite direction in the stream to impinge on the source.

References Cited in the file of this patent

UNITED STATES PATENTS

| 1,895,442 | Bowker | Jan. 31, 1933 |
| 2,512,743 | Hansell | June 27, 1950 |
| 2,592,134 | Firestone | Apr. 8, 1952 |

OTHER REFERENCES

Iron Age, June 8, 1944, pp. 60 and 61.